(12) United States Patent
Johnson et al.

(10) Patent No.: US 11,738,732 B2
(45) Date of Patent: Aug. 29, 2023

(54) AUTOMATIC RETARDING CONTROL SYSTEM

(71) Applicant: Caterpillar Inc., Peoria, IL (US)

(72) Inventors: Steven Edward Johnson, Metamora, IL (US); Adam J Adeeb, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/242,529

(22) Filed: Apr. 28, 2021

(65) Prior Publication Data

US 2022/0348180 A1 Nov. 3, 2022

(51) Int. Cl.
  *B60T 15/36* (2006.01)
  *B60T 13/14* (2006.01)
  *B60T 17/04* (2006.01)
  *F16K 17/04* (2006.01)
  *B60T 17/22* (2006.01)

(52) U.S. Cl.
  CPC ............ *B60T 15/36* (2013.01); *B60T 13/148* (2013.01); *B60T 17/04* (2013.01); *B60T 17/222* (2013.01); *F16K 17/04* (2013.01)

(58) Field of Classification Search
  CPC ........ B60T 15/36; B60T 13/148; B60T 17/04; B60T 13/686; B60T 13/662; B60T 17/222; B60T 7/042; F16K 17/04
  See application file for complete search history.

(56) References Cited

U.S. PATENT DOCUMENTS

| | | | | |
|---|---|---|---|---|
| 4,181,371 A | * | 1/1980 | Adachi | B60T 13/145 91/32 |
| 4,832,416 A | * | 5/1989 | Kaes | B60T 8/4004 180/197 |
| 5,312,083 A | * | 5/1994 | Ekman | F16K 15/021 137/513.5 |
| 6,092,881 A | | 7/2000 | Schantz | |
| 6,173,730 B1 | * | 1/2001 | Wilson | B60T 8/4054 137/115.15 |
| 6,520,044 B1 | | 2/2003 | Douglass | |
| 7,387,109 B2 | * | 6/2008 | Rembold | F02M 59/34 123/446 |
| 8,696,070 B2 | | 4/2014 | Costaz et al. | |

(Continued)

FOREIGN PATENT DOCUMENTS

| | | |
|---|---|---|
| CN | 204736839 | 11/2015 |
| DE | 10353146 | 6/2005 |

(Continued)

OTHER PUBLICATIONS

Written Opinion and International Search Report for Int'l. Patent Appln. No PCT/US2022/025181, dated Sep. 23, 2022 (14 pgs).

*Primary Examiner* — Patrick C Williams
(74) *Attorney, Agent, or Firm* — Schwegman Lundberg & Woessner, P.A.

(57) ABSTRACT

A retarding control assembly for a brake valve may include a bleed line configured for arrangement between a spring chamber of a brake command assembly and a tank line. The bleed line may include a check valve configured to allow fluid flow from the spring chamber to the tank and a check valve bypass configured to allow fluid flow from the tank line to the spring chamber passed the check valve and defining a restricted pathway.

16 Claims, 6 Drawing Sheets

(56) References Cited

U.S. PATENT DOCUMENTS

| | | | |
|---|---|---|---|
| 9,004,099 B2* | 4/2015 | Kim | F16K 27/0209 |
| | | | 137/543.19 |
| 9,221,443 B2 | 12/2015 | Ganzel | |
| 2002/0174652 A1* | 11/2002 | Nakano | B60T 15/36 |
| | | | 60/547.1 |
| 2004/0183367 A1* | 9/2004 | Kusano | B60T 8/441 |
| | | | 303/11 |
| 2006/0289068 A1* | 12/2006 | Miller | F16K 15/026 |
| | | | 137/513.3 |
| 2008/0284242 A1 | 11/2008 | Ganzel | |
| 2010/0127560 A1* | 5/2010 | Mamei | B60T 15/041 |
| | | | 303/2 |
| 2013/0193748 A1* | 8/2013 | Kajita | B60T 8/4872 |
| | | | 303/10 |
| 2016/0001755 A1* | 1/2016 | Takeuchi | B60T 13/686 |
| | | | 60/534 |
| 2019/0248348 A1 | 8/2019 | Ganzel | |

FOREIGN PATENT DOCUMENTS

| | | |
|---|---|---|
| DE | 102015004531 A1 | 10/2015 |
| GB | 1152852 | 5/1969 |
| WO | 2019195542 A1 | 10/2019 |

* cited by examiner

AUTOMATIC RETARDING CONTROL SYSTEM

TECHNICAL FIELD

The present application relates generally to hydraulic systems such as those used on work machines including trucks or other heavy equipment for construction, farm implements, and other machines adapted for performing work. More particularly, the present application relates to an automatic retarding control system for a hydraulic brake valve. Still more particularly, this present application relates to an internal orifice check configuration including a check valve in parallel with a restricted orifice and arranged between a spring chamber of a brake pedal and a tank.

BACKGROUND

Work machine brake systems include hydraulic brake valves for controlling the pressure delivered to the brake systems. The brake valves may be arranged between an accumulator and a brake and between a tank and a brake. The brake valve may function to selectively place the brakes in fluid communication with the accumulator, the tank, or neither the brake or tank depending on particular circumstances. The brake valve may be actuated by a brake pedal or an electro-hydraulic control. In some cases, a brake pedal may include a spring chamber below the brake pedal and hydraulic fluid in the chamber may be ejected when the pedal is pressed and the chamber may refill when the pedal is released. Control of the fluid flow into and out of the chamber can affect sensations experienced by the operator. For example, where free flow of fluid into/out of the chamber is provided, pressure spikes in the system may be experienced (e.g., felt through the foot) by the operator. However, Where fluid flow into the chamber is overly restricted or prevented, a void in the chamber may develop and/or noise may be heard when the brake pedal is released.

DE 10353146 is directed toward a hydrodynamic retarder for a commercial motor vehicle. The retarder (2) has a pressure accumulator (3) arranged in a closed loop (7) of a working medium (1) in an area of pressure supply before a retarder regulating valve (4). The pressure accumulator includes a coil spring. The accumulator is filled with the medium through supply of pressure from the regulating valve via a transmission pump, a supply orifice, and an integrated aperture.

SUMMARY

In one or more embodiments, a retarding control assembly for a brake valve may include a bleed line configured for arrangement between a spring chamber of a brake command assembly and a tank line. The bleed line may include a check valve configured to allow fluid flow from the spring chamber to the tank. The bleed line may also include a check valve bypass configured to allow fluid flow from the tank line to the spring chamber passed the check valve and defining a restricted pathway.

In one or more embodiments, a retarding control assembly for a brake valve may include a bleed line configured for arrangement between a spring chamber of a brake command assembly and a tank line. The bleed line may include a check valve configured to allow fluid flow from the spring chamber to the tank. The bleed line may also include a check valve bypass configured to allow fluid flow from the tank line to the spring chamber passed the check valve. The check valve bypass may be arranged in parallel with the check valve and may define a restricted pathway sized to damp pressure spikes and establish leakage flow to the spring chamber.

In one or more embodiments, a brake valve assembly may include a valve spool configured for arrangement between a brake and an accumulator and between the brake and a tank. The valve spool may have a disengaged position, a modulating position, and a filling position. The brake assembly may also include a chamber comprising a biasing mechanism for engaging a brake pedal and the valve spool to apply a brake command to the valve spool. The brake assembly may also include a bleed line arranged between the chamber and a tank line. The bleed line may be configured to allow free flow of fluid from the chamber through a check valve and to provide limited leakage flow from the tank line to the chamber.

DETAILED DESCRIPTION

Figure 1:
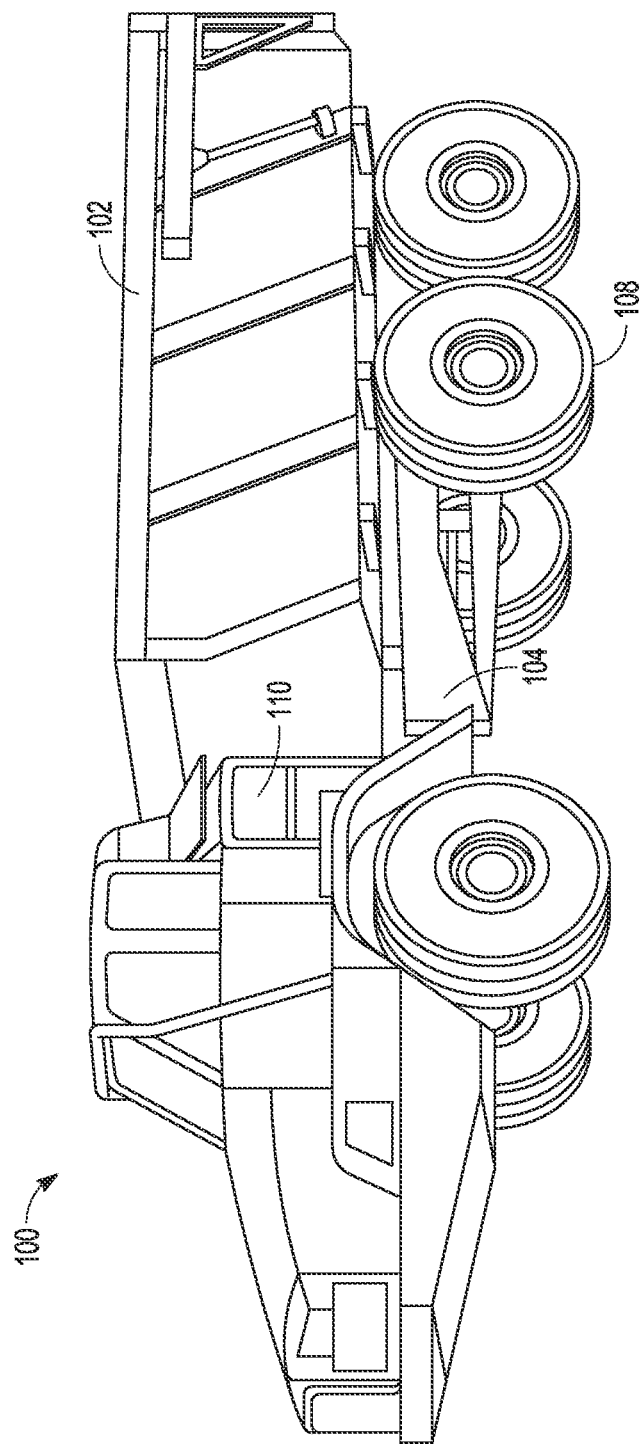
FIG. 1 is a perspective view of a work machine, according to one or more embodiments.

FIG. 1 is a perspective view of a work machine 100. As shown, the work machine 100 may be an articulated truck used for a variety of operations. That is, articulated trucks may be relatively maneuverable heavy equipment trucks and may be outfitted with a hauling bed as shown, or water tanks, flat beds, cages, or other bed configurations. As shown, the articulated truck may include a bed or vessel 102 adapted for receiving mined or dug material or other material, securing or storing the material during transportation from one location to another and for dumping the material. The work machine 100 may include a frame 104 for supporting the bed 102 and the work machine may include a plurality of ground supporting traction elements 108 (e.g., wheels, tracks, skid feet, etc.) for translating the work machine relative to a supporting surface. The traction elements 108 may be coupled to the frame 104 of the work machine 100 with a suspension system. The work machine 100 may include an engine or motor 110 to generate power and to drive the traction system 108 via a transmission and a drive train, for example. The work machine may also include a hydraulic brake system for actuating braking elements on the traction system to control or slow the speed of the work machine and/or stop the work machine. In one or more embodiments, the brake system may function alongside and/or in conjunction with an overall hydraulic system on the work machine such as a hydraulic system configured for raising and lowering the truck bed 102, for example.

Figure 2:
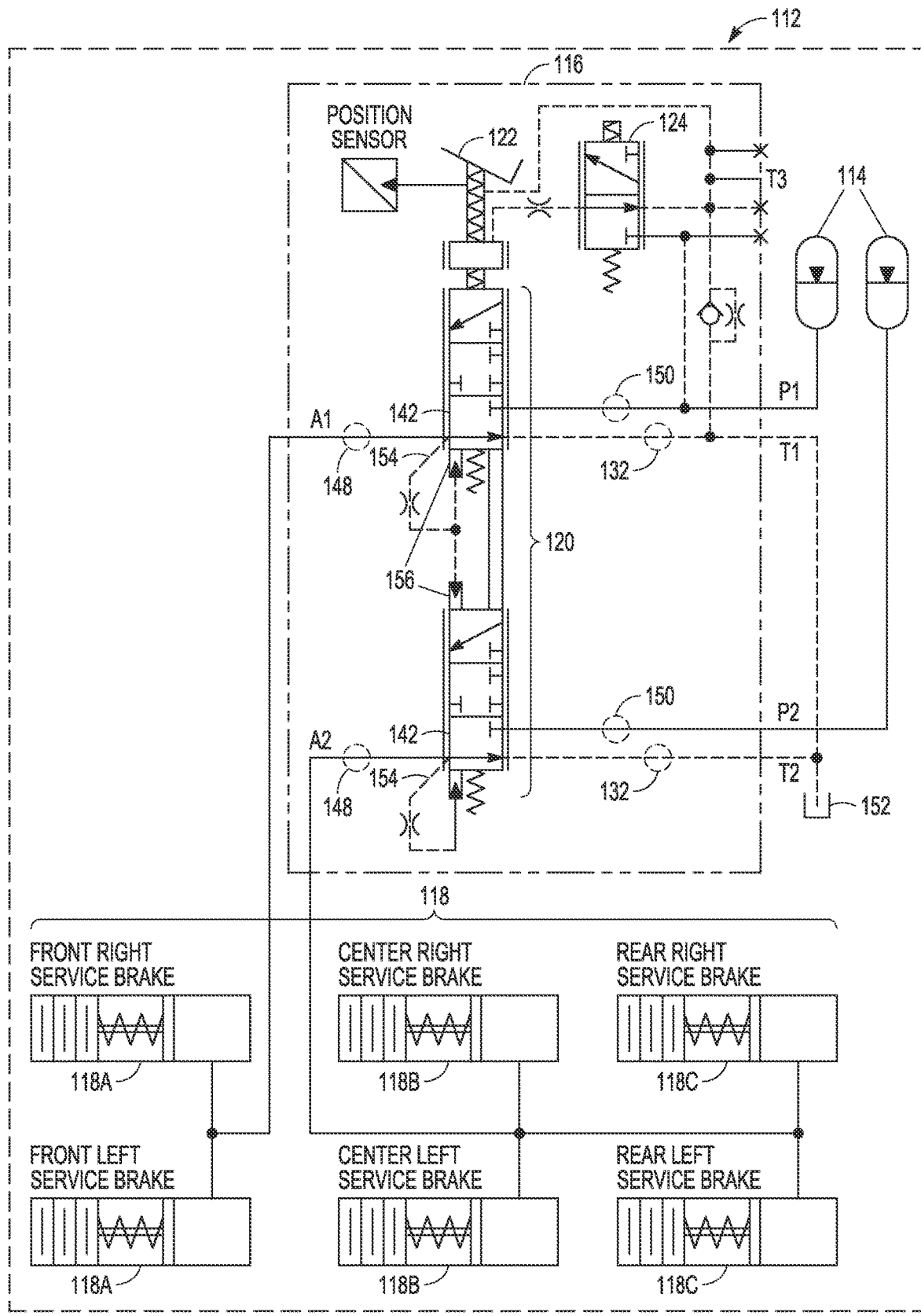
FIG. 2 is a hydraulic schematic of a work machine brake system with a brake valve in a disengaged position, according to one or more embodiments.

Referring now to FIG. 2, the brake system 112 is shown. The brake system 112 may be configured for controllably engaging one or more brakes to slow the work machine down, stop the machine, and or hold the machine in a stationary position. The brake system 112 may be particularly configured to do so in response to operator actuation of a foot pedal or other actuation element and/or automatically based on one or more factors. As shown in FIG. 2, in one or more embodiments, the brake system 112 may include an accumulator 114 in high-pressure fluid communication with a brake via a brake valve 116. In the particular case shown in FIG. 2, two accumulators 114 are shown where each accumulator 114 is in fluid communication with a group of brakes 118 via respective portions of a spool 120 of the brake valve 116. The brake valve 116 may be actuatable by a manually actuated pedal 122, an electro-hydraulic control 124, or both.

The accumulator 114 may be configured to have high-pressure brake fluid available to respond quickly to brake actuation. In one or more embodiments, the accumulator may include a pressure storage reservoir containing incompressible hydraulic fluid. The accumulator may include a pressurization source such as a compressed gas, a spring, or a potential energy source such as a relatively heavy elevated weight, for example. In one or more embodiments, the accumulator may include a hydro-pneumatic accumulator.

The brakes 118 may be configured to indirectly engage a rotating wheel (e.g., a rim/tire-type wheel, a wheel in a traction system, or another type of wheel) so as to convert kinetic energy to heat through a frictional engagement. In one or more embodiments, the brake may be a disc brake, a drum brake, or another type of brake may be provided. In the case of disc brakes, the brake may include a rotor substantially rigidly secured to the wheel or axle of the wheel so as to rotate with the wheel. The brakes 118 may also include a caliper having brake pads arranged thereon for clamping the rotor. That is, the caliper may be substantially rigidly secured to the frame, at least indirectly and at least with respect to rotation, such that when the caliper clamps the rotor with the brake pad, the caliper and brake pad remain stationary relative to the work machine and the rotor passing through the brake pads generates heat through friction to slow and/or stop the work machine. The caliper or other actuation device may include a biasing mechanism such as a spring for maintaining the brakes in an open or disengaged position unless/until pressure from the brake system overcomes the biasing mechanism to engage the brakes.

As shown in FIG. 2, the work machine may include a brake at one or more locations including at each portion of a traction system (e.g., each wheel). In one or more embodiments, as shown, a brake 118A may be provided at each front wheel, a brake 118B may be provided at each center wheel, and a brake 118C may be provided at each rear wheel. In one or more embodiments, the brake system 112 may group one or more brakes and provide fluid to the brakes based on those groups. As shown, the front brakes 118A may be grouped and the center and rear brakes 118B/C may be grouped.

Figure 3:
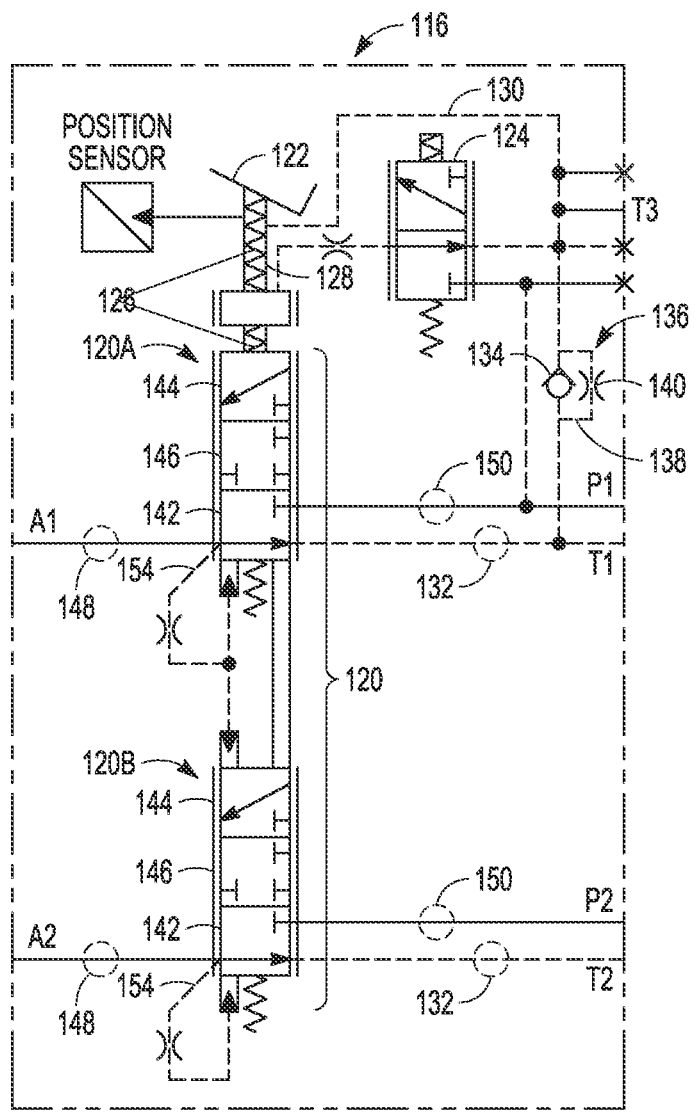
FIG. 3 is a close-up view of the brake valve of the brake system of FIG. 2, according to one or more embodiments.

Turning now to FIG. 3, a close-up view of the brake valve 116 is shown. The brake valve 116 may be configured to provide for operator or automatic control of the fluid flow to the brakes 118 to control engagement of the brakes 118. The brake valve 116 may include one or more command devices such as a brake pedal 122 and/or an electro-hydraulic control 124. The brake pedal 122, the electro-hydraulic control 124, or both may be coupled to one or more valve spools 120 to selectively and controllably apply the brakes with variable pressure. The brake pedal 122 and the electro-hydraulic control 124 may be coupled to the brake spool 120 or spools via actuation springs 126 or other biasing mechanisms that establish a biasing force against the one or more valve spools 120 when the brake pedal 122 is pressed or when the electro-hydraulic control 124 actuates a command. The biasing mechanism 126 between the brake pedal 122 and the valve spool 120 may be contained in a spring chamber 128 as shown and a bleed line 130 may extend away from the spring chamber 128 to a tank line 132.

As shown, the bleed line 130 may include a check valve 134. The check valve 134 may be arranged to prevent fluid flow from the tank line 132 to the spring chamber 128 and to allow flow from the spring chamber 128 to the tank 132. As such, when the brake pedal 122 is pressed, fluid in the spring chamber 128 may flow substantially freely from the spring chamber 128 to tank. However, when the brake pedal 122 is released, fluid flow from the tank line 132 to the spring pedal chamber may be prevented by the check valve 134. For this purpose, a flow-restricted bypass 136 may be provided at the check valve 134. That is, as shown, a bypass line 138 may be provided around the check valve 134 (e.g., in parallel fluid flow with the check valve 134) providing for fluid flow from the tank line 132 to the bleed line 130 and, thus, to the spring chamber 128. However, the bypass line may include a flow restriction 140 in the form of a restricted orifice or other type of hydraulic flow restriction. This flow-restricted bypass 136 may provide for limited fluid flow to the spring chamber 128 when the brake pedal is released. This may help to avoid voiding of the spring chamber 128 when the pedal is released and may avoid noise that may result therefrom. Moreover, the limited nature of the fluid flow due to the restricted flow may damp pressure spikes that may occur in the system and may otherwise reach the spring chamber 128 and affect pedal feel. In one or more embodiments, the orifice may have a range of approximately 0.25 mm to approximately 2 mm, or approximately 0.40 mm to approximately 1.5 mm, or approximately 0.60 mm to approximately 1.00 mm. In one or more embodiments, the flow restriction 140 may take the form of one or more of the following. For example, the flow restriction 140 may be a narrow orifice arranged in a separate line running parallel and/or around the check valve. Alternatively or additionally, the flow restriction may include a hole or orifice arranged (e.g., drilled) in the poppet of a check valve. In this case, while parallel flow may be provided, a separate line might not be provided. Alternatively or additionally, the flow restriction may include an annular clearance in the check valve. Again, while this approach may provide for parallel flow, a separate line extending around the check valve might not be provided. Still other approaches to implementing a flow restriction 140 may be provided.

The valve spool 120 may be the particular device within the brake valve 116 that is configured to control the fluid going to the brakes 118 based on commands it receives from the manual brake pedal 122 and/or the electro-hydraulic control 124. The spool 120 may be a spring-centered valve spool or another type of centering mechanism may be used. In one or more embodiments, the valve may include multiple spools 120A/B each having a plurality of valve positions. As shown, in one or more embodiments, the valve may include two spools, each having three valve positions. A first spool 120A may be arranged in fluid communication and between the first accumulator 114 and the front brakes 118A and the second spool 120B may be arranged in fluid communication and between the second accumulator 114 and the center and rear brakes 118B/C. The multiple brake spools 120A/B may provide for the use of different pressures to the respective brake or groups of brakes that are controlled by each spool.

Moreover, the multiple accumulators 114 may provide redundancy within the brake system such that failures in one portion may avoid a complete loss of brake functionality because the other portion may remain functional.

Based on actuation by the brake pedal 122 and/or the electro-hydraulic control 124, force may be exerted on the one or more valve spools 120 to move the spools 120 against the centering force of the centering spring and between the one or more valve positions. For example, each of the valve portions may include a disengaged position 142, a filling position 144, and a modulating position 146.

FIG. 2 shows the two spools 120A/B of the brake valve in a disengaged position 142. The disengaged position 142 may be configured to isolate the pressure from the accumulators 114 and avoid pressure in the brake lines 148. As shown, the disengaged position 142 closes off the accumulator line 150 at the valve spool 120 and the brake line 148 is placed in fluid communication with the tank 152 via the tank line 132 allowing pressurized fluid in the brake line 148 to flow back to the tank 152 or to otherwise avoid pressure in the brake line 148. As also shown, a pressure signal line or pathway 154 may be provided to communicate the brake line pressure near the first spool 120A (e.g., front brake line pressure) to the bottom of the first spool 120A and the top of the second spool 120B, In addition, a pressure signal line or pathway 154 may be provided to communicate the brake line pressure near the second spool 120B (e.g., center and rear brake line pressure) to the bottom of the second spool 120B. The pressure signal line or pathway 154 may establish a pressure feedback on the spools 120A/B.

Figure 4:
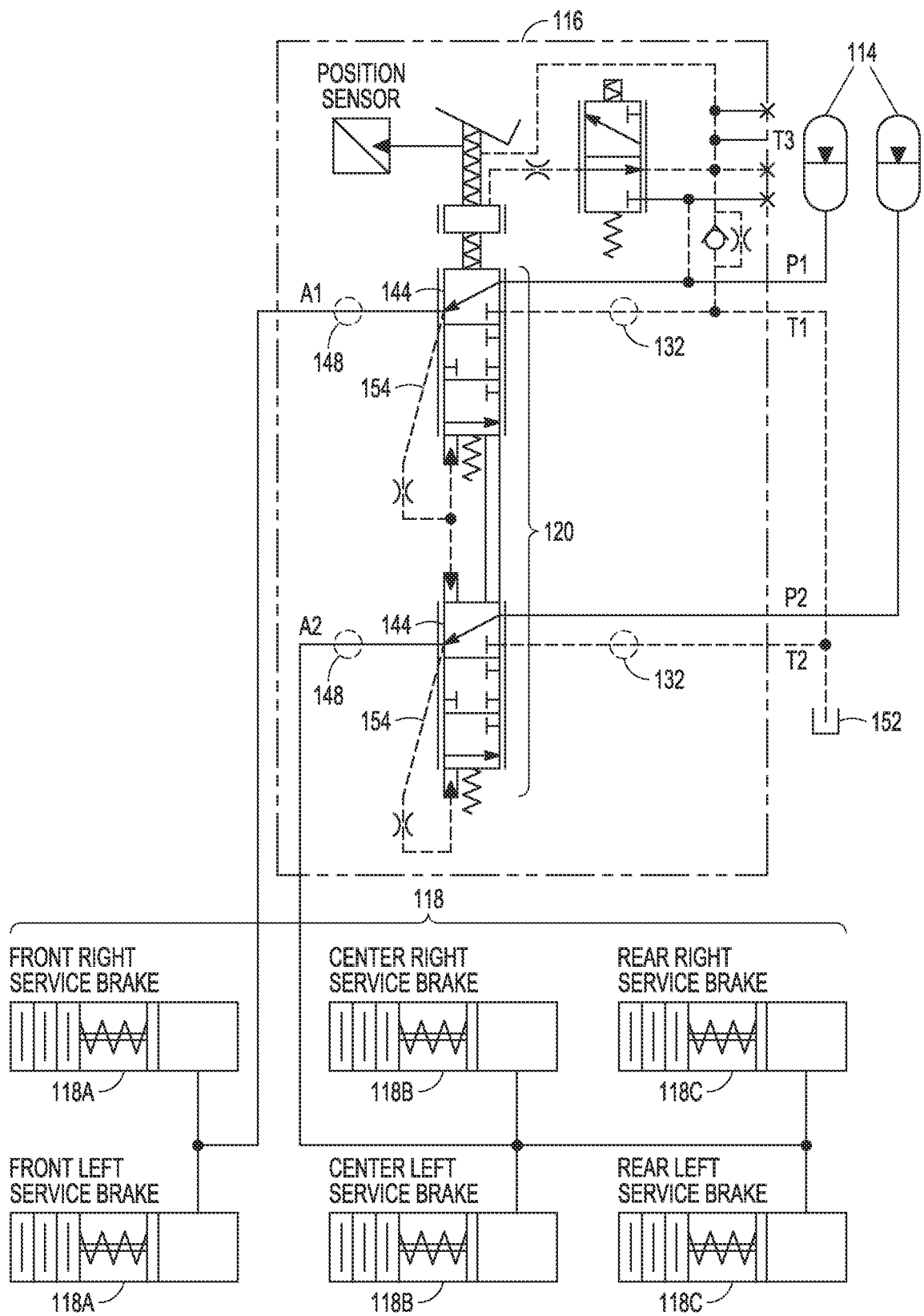
FIG. 4 is a hydraulic schematic of a work machine brake system with a brake valve in a filling condition, according to one or more embodiments.

FIG. 4 shows the two spools 120A/B of the brake valve 116 in a filling position 144. This filling position 144 may be configured to quickly deliver fluid to the brakes 118. As shown, the filling position 144 may place the accumulator 114 in fluid communication with the brake 118 and, as such, fluid may flow to the brake 118 from the accumulator to fill the brake 118. The tank line 132 may be closed off at the spool 120 in this condition to avoid fluid leakage back to tank 152 and to allow fluid pressure to develop in the brake line 148 once the brakes are full. The pressure signal lines or pathways 154 in this position may remain in fluid communication with the respective bottoms and top of the spools 120 as with the disengaged position 142 and may, accordingly, provide pressure feedback to the spools 120A/B.

Figure 5:
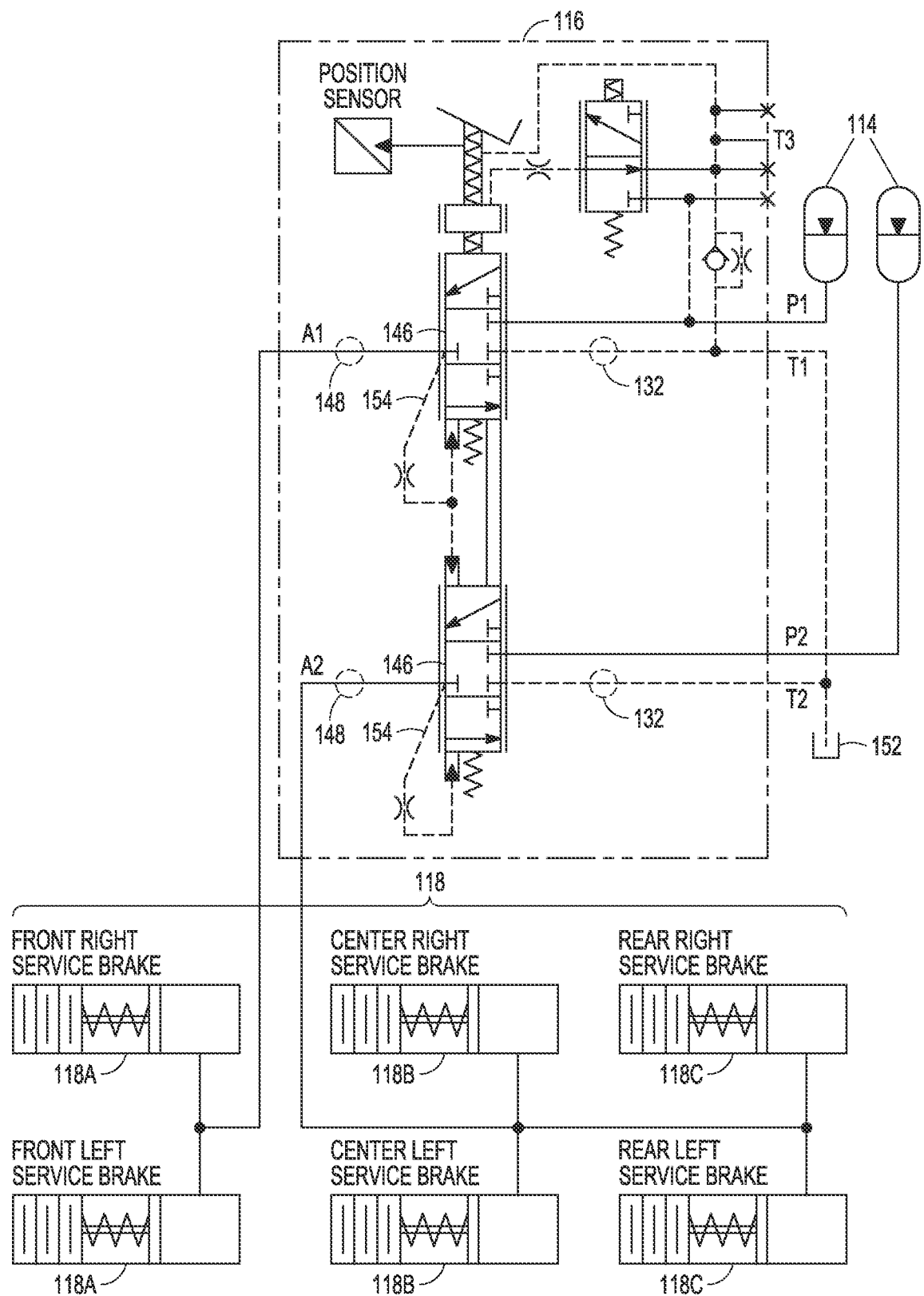
FIG. 5 is a hydraulic schematic of a work machine brake system with a brake valve in a modulating position, according to one or more embodiments.

FIG. 5 shows the two spools 120 of the brake in the modulating position 146. This position 146 may be configured to maintain the pressure condition in the brake lines 148. Moreover, the location of the modulating position 146 between the disengaged position 142 and the filling position 144 may provide for modulation back and forth between these respective positions. In this modulating position 146, fluid flow across the valve 116 is fully or substantially closed off That is, the modulating position 146 closes off all of the accumulator line 150, the tank line 132, and the brake line 148 at the valve 116. Again, the pressure signal lines or pathways 154 in this position may remain in fluid communication with the respective bottoms and top of the spools 120 as with the disengaged and filling positions 142/144.

INDUSTRIAL APPLICABILITY

Figure 6:
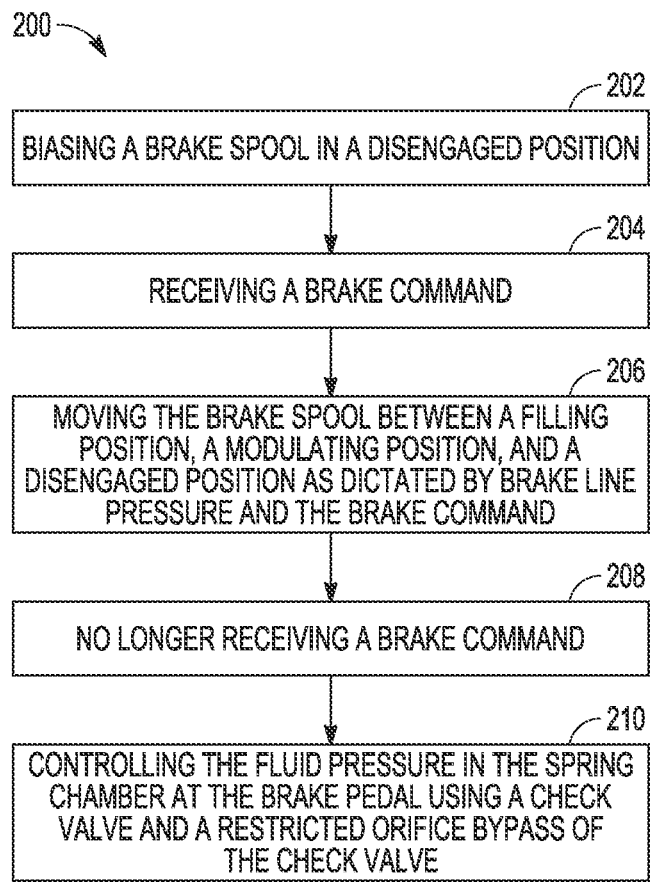
FIG. 6 is a diagram depicting a method of operation of the brake system of FIGS. 2-5, according to one or more embodiments.

In operation and use, the present hydraulic system may provide for variable pressure application to the brakes under the control of the operator and/or an electro-hydraulic control and voiding of the spring chamber below the brake pedal may be avoided, reduced, or minimized. In one or more embodiments, a method of operation 200 may be provided as shown in FIG. 6.

The method 200 may include biasing a brake spool in a disengaged position 202. The method may also include receiving a brake command 204. The method may also include moving the brake spool between a filling position, a modulating position and a disengaged position as dictated by brake line pressure and the brake command 206. The method may also include no longer receiving a brake command 208. Throughout these processes, fluid pressure in the spring chamber at the brake pedal may be controlled using a check valve and a restricted orifice bypass of the check valve 210.

With respect to biasing the brake valve in the disengaged position 202, the spring centered brake valve may have a neutral or centered position that places the valve in the disengaged position when no brake command is provided. In this position, no command is being generated by the brake pedal or the electro-hydraulic control and, as such, each spool of the brake valve is biased by the centering spring in a direction that aligns the disengaged position with the accumulator line and the tank line as shown in FIG. 2. With the accumulator line closed off and fluid communication between the brake line and the tank being open, fluid may be free to flow to the tank. For example, when the brakes are fully released, biasing mechanisms in the brakes may retract the calipers and the fluid in the brake line may flow toward the tank under the biasing force of the calipers.

With respect to receiving a brake command 204, the brake system may receive a brake command from the brake pedal or the electro-hydraulic control. For example, an operator may have pressed on the brake pedal. This may compress the spring below the brake pedal, which may overcome the resistance of the centering spring causing the brake valve to move from the disengaged position all the way to the filling position. Similarly, where a command is generated by the electro-hydraulic control, fluid pressure may be generated by the electro-hydraulic control to drive a collar against a spring, pressing on the spool and overcoming the centering spring resistance similar to force from the brake pedal. Still further, the operator may have the ability to apply more brake command than called for by the electro-hydraulic control. For example, if a command from the electro-hydraulic control is 50% of the total available command, the operator can apply a higher command if desired. In some situations, fix example, the operator may have a desire to stop the machine faster than being called for by the electro-hydraulic control.

This process of receiving a brake command may be one example where fluid pressure in the spring chamber is controlled 210. For example, during the process of receiving a brake command fluid may be ejected from the spring cylinder to avoid ancillary brake pedal resistance (e.g., resistance not reflective of brake pressure). This may occur by opening of a check valve and allowing spring chamber fluid to flow to the tank.

With respect to moving the brake spool between a filling position, a modulating position, and a disengaged position as dictated by brake line pressure and the brake command 206, reference is made to FIGS. 2, 4, and 5. As shown in FIG. 4, upon receiving the brake command, the two spools may move together such that both spools are in the filling position placing the accumulator in fluid communication with the brakes and closing off the tank line. The accumulator may, thus, rapidly force fluid through the brake valve and into the brakes. Finding little resistance to compress the springs in the brakes, the brake line may remain at relatively low pressure while the brakes are filling. Accordingly, the first pressure signal line or pathway may carry a low pressure signal to the bottom of the first spool and the top of the second spool and the second pressure signal line or pathway may do the same to the bottom of the second spool. Due to the low-pressure signal, this communication may have little to no effect on the spool position. In particular, the pressure feedback on the spools 120A/B provided by the signal line or pathway may be insufficient affect the spool position. The brake spool may remain in the filling position until the brakes are full and a brake pressure corresponding to the brake command develops.

Turning now to FIG. 5, the brake pedal or electro-hydraulic control may continue to provide a command to engage the brakes and, as such, the brakes may fill until they develop a pressure consistent with the brake command. As shown in FIG. 5, the brakes may have become filled with oil and, as such, a pressure may have developed in the brake line. That is, the brakes may be engaged, full of oil, and the brakes may be at medium pressure, for example. A pressure signal via the first pressure signal line or pathway may communicate the brake line pressure near the first spool (e.g., front brake line pressure) to the bottom of the first spool and the top of the second spool. In addition, a pressure signal via the second pressure signal line or pathway may communicate the brake line pressure near the second spool (e.g., center and rear brake line pressure) to the bottom of the second spool. Due to the increase in pressure of the brake lines (e.g., because the brakes are full), this may establish a pressure feedback that affects the functionality of the spools.

Beginning with the first spool, the developed pressure in the brake line that is communicated to the bottom of the first spool may create a force that counteracts the command force from the pedal or electro-hydraulic control such that when a corresponding brake pressure is reached in the brake line, the spool may be driven back against the command force to balance the spool at the modulating position shown in FIG. 5. In this position, the brake line may be closed off from the accumulator and from the tank causing the system to maintain the selected brake line pressure. Where additional command force is applied, the spool may move back to the filling position until a brake line pressure corresponding to the increased command force is reached, whereafter the signal communicated to the bottom of the first spool may cause it to move back to the modulating position. On the other hand, where less command force is applied, the signal communicated to the bottom of the first spool may cause the spool to move to the disengaged position allowing fluid to flow to tank until a pressure corresponding to the lesser command force is reached, whereafter the lesser command force balances with the signal communicated to the bottom of the first spool causing the spool to move back to the modulating position and maintain a brake pressure consistent with the current brake command.

Regarding the second spool, the developed pressure in the front brake line that is communicated to the top of the second spool may create a force that establishes a command force on the second spool. Here, the developed pressure in the center and rear brake line may be communicated to the bottom of the second spool which may create a force that counteracts the commanded force. When a brake line pressure in the center and rear brake line reaches a pressure corresponding to the commanded force, the spool may be balanced and may arrive at the modulating position shown in FIG. 5. In this position, the brake line may be closed off from the accumulator and from the tank causing the system to maintain the selected brake line pressure. Like the first spool, where additional command force is applied or where less command force is applied, the spool may modulate between the disengaged position and the filling position based on these adjusted commands.

Throughout these processes of modulating between a filling position and a disengaged position, the method step of controlling the fluid pressure in the spring chamber below the brake pedal 210 may be performed. That is, where a brake command is increased, fluid in the spring chamber may be ejected via the bleed line and check valve to tank to avoid ancillary brake pedal feedback. Further, when the brake command is reduced, fluid may flow through a bypass line around the check valve and to the spring chamber such that voiding of the spring chamber is avoided.

With respect to no longer receiving a brake command 208, the spool may become biased in the disengaged position and brake line fluid may be allowed to flow to tank releasing the brake line pressure. Still further, as the brake command is released, fluid may flow around the check valve via the bypass line and through a restricted orifice or pathway to backfill the spring chamber below the brake pedal.

The above detailed description is intended to be illustrative, and not restrictive. The scope of the disclosure should, therefore, be determined with references to the appended claims, along with the full scope of equivalents to which such claims are entitled.

What is claimed is:

1. A retarding control assembly for a brake valve, comprising:
    a bleed line configured for arrangement between:
    a tank line beginning at a brake and extending to a tank via a brake spool; and
    a spring chamber that delivers a flow of fluid through the bleed line and to the tank line when a brake pedal is pressed, the bleed line comprising:
    a check valve configured to allow fluid flow from the spring chamber to the tank; and
    a check valve bypass configured to allow fluid flow from the tank line to the spring chamber past the check valve and defining a restricted pathway.

2. The assembly of claim 1, wherein the restricted pathway comprises a pathway having a restricted orifice.

3. The assembly of claim 2, wherein the restricted pathway comprises a line extending around the check valve.

4. The assembly of claim 2, wherein the restricted orifice is sized to damp pressure spikes from an associated brake system.

5. The assembly of claim 4, wherein the restricted orifice is sized to establish leakage flow to the spring chamber.

6. The assembly of claim 5, wherein the restricted orifice has a size ranging from approximately 0.6 mm to approximately 1 mm.

7. A retarding control assembly for a brake valve, comprising:
    a bleed line configured for arrangement between:
    a tank line beginning at a brake and extending to a tank via a brake spool; and
    a spring chamber that delivers a flow of fluid through the bleed line and to the tank line when a brake pedal is pressed, the bleed line comprising:
    a check valve configured to allow fluid flow from the spring chamber to the tank; and
    a check valve bypass configured to allow fluid flow from the tank line to the spring chamber past the check valve, the check valve bypass arranged in parallel with the check valve and defining a restricted pathway sized to damp pressure spikes and establish leakage flow to the spring chamber.

8. The assembly of claim 7, wherein the restricted pathway comprises a pathway having a restricted orifice.

9. The assembly of claim 8, wherein the restricted pathway comprises a line extending around the check valve.

10. The assembly of claim 8, wherein the restricted orifice has a size ranging from approximately 0.6 mm to approximately 1 mm.

11. A brake valve assembly, comprising:
a valve spool configured for arrangement between a brake and an accumulator and between the brake and a tank, the valve spool having a disengaged position, a modulating position, and a filling position;
a chamber comprising a biasing mechanism for engaging a brake pedal and the valve spool to apply a brake command to the valve spool; and
a bleed line arranged between the chamber and a tank line beginning at the brake and extending to the tank via the valve spool, the bleed line configured to allow free flow of fluid from the chamber through a check valve when the brake pedal is pressed and to provide limited leakage flow from the tank to the chamber when the brake pedal is released.

12. The assembly of claim 11, wherein the limited leakage flow is provided by a restricted pathway comprising a pathway having a restricted orifice.

13. The assembly of claim 12, wherein the restricted pathway comprises a line extending around the check valve.

14. The assembly of claim 12, wherein the restricted orifice is sized to damp pressure spikes from an associated brake system.

15. The assembly of claim 14, wherein the restricted orifice is sized to establish leakage flow to the spring chamber.

16. The assembly of claim 15, wherein the restricted orifice has a size ranging from approximately 0.6 mm to approximately 1 mm.

* * * * *